United States Patent [19]

Zocholl

[11] 4,259,706
[45] Mar. 31, 1981

[54] SOLID STATE RELAY

[75] Inventor: Stanley E. Zocholl, Holland, Pa.

[73] Assignee: Gould Inc., Rolling Meadows, Ill.

[21] Appl. No.: 949,015

[22] Filed: Oct. 6, 1978

[51] Int. Cl.³ .......................................... H02H 3/093
[52] U.S. Cl. ......................................... 361/96; 361/93
[58] Field of Search ...................... 361/96, 97, 95, 94, 361/93, 98, 31, 24, 196; 307/293, 230; 328/144, 143

[56] References Cited

U.S. PATENT DOCUMENTS

| | | | |
|---|---|---|---|
| 3,018,416 | 1/1962 | Karlicek et al. .................. | 361/95 X |
| 3,419,757 | 12/1968 | Steen ...................... | 361/96 |
| 3,558,978 | 1/1971 | Nye, Jr. .............. | 361/31 X |
| 3,689,801 | 9/1972 | Engel et al. .............. | 361/96 |
| 3,701,908 | 10/1972 | Neer et al. ................. | 307/230 X |
| 3,919,600 | 11/1975 | Sons ...................... | 361/31 |
| 4,131,929 | 12/1978 | Moran .................... | 361/97 X |
| 4,158,824 | 6/1979 | Wouters et al. ............. | 307/230 X |

*Primary Examiner*—Patrick R. Salce
*Attorney, Agent, or Firm*—Ostrolenk, Faber, Gerb & Soffen

[57] ABSTRACT

A solid state relay for interrupting current flow in a power distribution circuit is disclosed. The relay includes a long time delay circuit which generates a first trip signal when the magnitude of the peak instantaneous line current rises above a pickup value I1 for a time period which varies as an inverse function of the magnitude of the peak instantaneous time current and which is determined by a first predetermined time current characteristic curve. The first predetermined time current characteristic curve defines the desired operating characteristic of the relay over a first current range extending between the pickup current I1 and the higher current I2. The predetermined time current characteristic curve is determined by a multi-node RC element in the feed back loop of an operational amplifier which forms part of the long time delay circuit.

16 Claims, 9 Drawing Figures

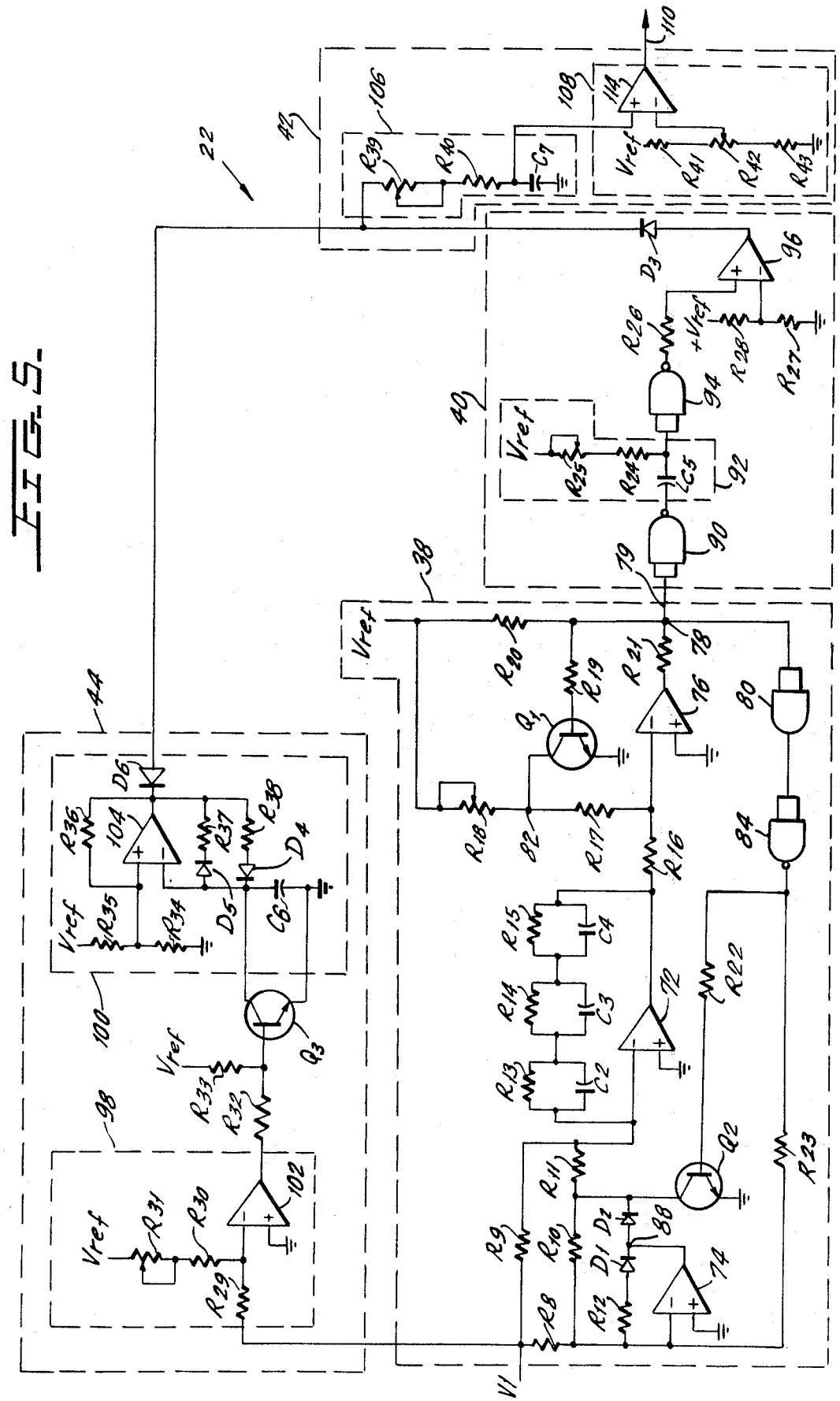

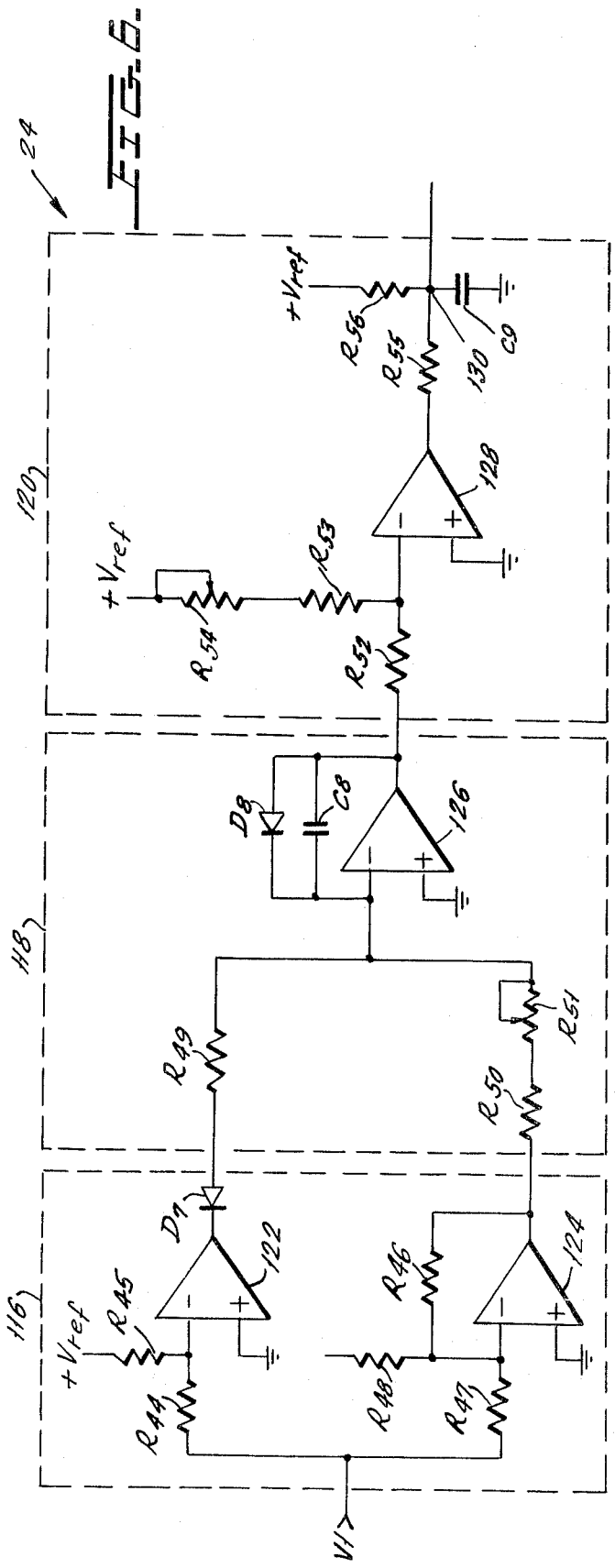
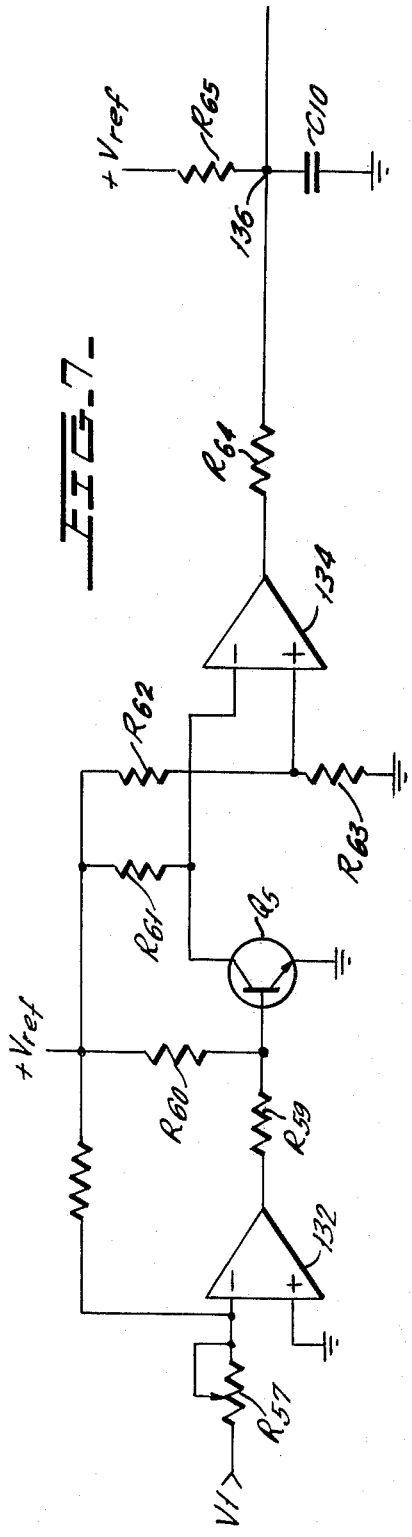

SOLID STATE RELAY

BACKGROUND OF THE INVENTION

The present invention relates to circuit protection apparatus and more particularly to a novel solid state tripping circuit for controlling the operation of a circuit breaker.

A conventional circuit breaker may utilize a combination of electromagnetic and electrothermal mechanisms to initiate the mechanical separation of its current carrying contacts in the event of an excessive flow of current in the circuit protected by the circuit breaker.

A bimetallic element may thermoelectrically monitor the value of current flow for actuation of the mechanical contact separation mechanism after a long time delay established by the inverse current-squared-versus time curve of the bimetallic element for circuit currents at least a selected percentage, e.g. 10%, greater than the rated current of the circuit breaker. A single long time delay curve is permanently established for a particular configuration of bimetallic element and cannot be easily varied to accommodate different values of rate current, initial and final points on the curve or rate of curve change. Disassembly of the circuit breaker and substitution of a different bimetal element is normally required to change the long time delay response to the conventional circuit breaker.

An electromagnetic trip coil may actuate the mechanical contact separation mechanism after a comparatively short time delay for overcurrent ratios greater than a range of ratios of the bimetal element. The time delay curve of the electromagnetic trip mechanism is a function of the number of conductor turns utilized and is inversely proportional to the magnitude of current flow through the coil. The curve is generally not adjustable without disassembly and replacement of selected parts of the circuit breaker unit.

Thus, the proper operation of the inter-related mechanical elements of a circuit breaker utilizing thermoelectric and electromagnetic trip mechanisms requires relatively precise and unadjustable parts and results in a relatively costly unit. The normal current rating of a particular conventional circuit breaker is not easily varied and it is not possible to test the function of the conventional circuit breaker unit without requiring disconnection of the line and load connectors therefrom.

It is desirable to provide a circuit breaker with a contact separation mechanism actuated by a tripping circuit having a maximum proportion of solid state components to realize a high degree of efficiency, reliability and economy while allowing the tripping circuit to be easily tested without removing line and load conductors from the circuit breaker. It is also desirable to provide a tripping circuit which will allow a full range of adjustment in the various time delays required for a range of over-current ratios, as well as enabling the adjustment of the normal current rating of the circuit breaker unit over a relatively wide range with a minimum number of component adjustments.

STATE OF THE ART

A series of static relays, each capable of monitoring line conductor current flow to actuate a separable contact mechanism to its open condition, is described and claimed in U.S. Pat. Nos. 3,319,127 to Zocholl et al. 3,573,555, and 3,327,171 to Lipnitz et al; and 3,766,346 to Zocholl and 4,060,844 to Davis et al; all of which patents have been assigned to the assignee of the present invention. These static relays provide solid state circuitry, utilizing a time delay network requiring a plurality of resistors and capacitors to achieve a single inverse current-time relationship. High-precision resistors and capacitors are required and their values are obtained from the solution of a set of simultaneous equations, whereby network design and adjustment for a different delay relationship is a somewhat lengthy process. Additional components, in the form of clamp diodes and a clamp multivibrator, are necessary to allow rapid adjustment of the delay time. Adjustment of the current rating of the prior art relay required simultaneous replacement of several components. Substantially instantaneous trigger of the contact mechanism for all line currents over a selected overcurrent ratio was not possible, as the delay of the R-C network always determined the current-time relationship.

A solid state tripping circuit is desired which realizes even greater reduction of adjustable component count and cost, while maximizing efficiency, reliability and range of operable over-current ratios.

BRIEF DESCRIPTION OF THE INVENTION

The relay of the present invention comprises an input circuit, a long time delay circuit and a circuit interrupter. The input circuit generates a peak line current signal representative of the peak instantaneous current in the power distribution circuit. The peak line current signal is applied to the long time delay circuit which generates a first trip signal when the magnitude of the peak instantaneous line current rises above a pickup value $I1$ for a time period which varies as an inverse function of the magnitude of the peak instantaneous time current and which is determined by a first predetermined time-current characteristic curve. The first predetermined time-current characteristic curve defines the desired operating characteristic of the relay over a first current range extending between the pickup current $I1$ and a higher current $I2$. The predetermined time current characteristic curve is determined by a multinode RC element in the feed back loop of an operational amplifier which forms part of the long time delay circuit. The circuit interrupter is responsive to the trip signal generated by the long time delay circuit and interrupts current flow in the power distribution circuit responsive to generation of the trip signal.

BRIEF DESCRIPTION OF THE DRAWINGS

For the purpose of illustrating the invention there is shown in the drawings a form which is presently preferred; it being understood, however, that this invention is not limited to the precise arrangements and instrumentalities shown.

FIG. 5 is a circuit diagram of a long time delay circuit which may be utilized in connection with the present application.

FIG. 6 is a circuit diagram of a short time delay circuit which may be utilized in connection with the present invention.

FIG. 7 is a circuit diagram of an instantaneous circuit which may be utilized in connection with the present invention.

FIG. 8 is a circuit diagram of a line interrupter circuit which may be utilized in connection with the present invention.

FIG. 9 is a circuit diagram of an indicator circuit which may be utilized in connection with the present invention.

DETAILED DESCRIPTION OF THE INVENTION

Figure 1:
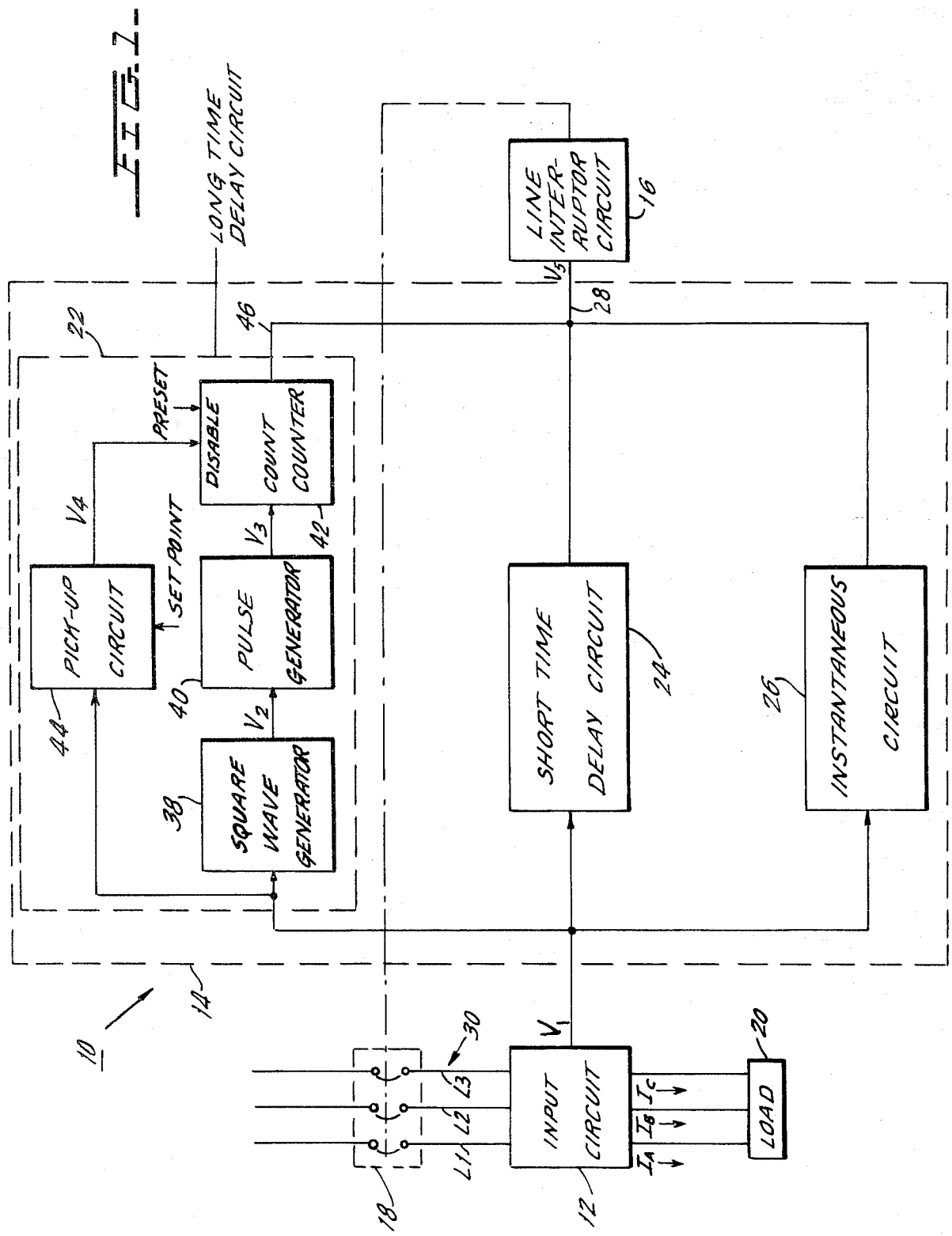
FIG. 1 is a block diagram of a solid state relay construction in accordance with the principals of the present invention.

Referring now to the drawings wherein like numbers indicate like elements, there is shown in FIG. 1 a block diagram of a solid state relay constructed in accordance with the principles of the present invention and designated generally as 10. Relay 10 includes an input circuit 12, a timing circuit 14, a line interruptor circuit 16 and a contact mechanism 18. The contact mechanism is coupled to three power lines L1, L2 and L3 intermediate a three-phase power source (not shown) and a load 20. While a three-phase power distribution circuit (hereinafter power distribution circuit 30) is illustrated, it should be recognized that the present invention may be utilized in connection with a one phase or any other desired phase power distribution circuit.

The input circuit 12 monitors the current flowing in each of the conductors L1–L3 and generates an output signal V1 which is proportional to the highest peak current ($I_a$, $I_b$ or $I_c$) flowing in any of the three lines L1, L2 or L3. The instantaneous current available from each conductor L1–L3 varies as a function of the phase and load. As a result, only one of the currents $I_a$, $I_b$ or $I_c$ will be instantaneously greater than the remaining currents. The magnitude of the output signal V1 generated by input circuit 12 is representative of the magnitude of the current $I_a$, $I_b$ or $I_c$ which is greatest at any given instant. Stated otherwise, this signal is representative of the peak instantaneous value of the current in distribution circuit 30.

The output signal V1 (hereinafter the peak line current signal) generated by input circuit 12 is applied to timing circuit 14 which generates a trigger signal V5 at its output 28 responsive to a predetermined relationship between the magnitude of the peak current in distribution circuit 30 and a time duration for which the peak current remains above a predetermined value. Preferably, the predetermined relationship is that illustrated in FIG. 2. As shown therein, timing circuit 14 has three discrete ranges of operation. The first range extends between pickup current I1 and a higher current I2 and is exemplified by curve 32. This range of operation is controlled by long time delay circuit 22 and has an inverse time current relationship which is well known to those skilled in the art. The second range of operation extends between current I2 and a higher current I3 and is exemplified by curve 34. This range of operation is controlled by short time delay circuit 24 and has a less steep slope than curve 32. The third range of operation includes all currents equal to and above an instantaneous trip current I3 and is controlled by instantaneous circuit 26. When the magnitude of the peak instantaneous current in distribution circuit 30 reaches the value I3, instantaneous circuit 26 instantaneously generates a trip signal V5. The piecewise linear curve of FIG. 2 approximates the time-circuit characteristic of a thermal switch. As a result, the solid state relay of the present invention exhibits both the durability and reliability of an electronic circuit and the desirable time-current characteristics of the mechanical thermal relay.

As noted above, the operation of timing circuit 14 occurrence falling between current I1 and current I2 is controlled by long time delay circuit 22. Long time delay circuit 22 (FIG. 1) comprises a square wave generator 38, a pulse generator 40, a counter 42 and a pickup circuit 44 and generates a trip signal at its output 46 in accordance with the inverse time current relationship illustrated by curve 32 of the graph of FIG. 2. As shown therein, long time delay circuit 22 does not generate a trip signal for any value of current less than the pickup current I1. Current I1 is preferably greater than the rated current $I_{rated}$ of distribution circuit 30 and is determined by the set point input to pickup circuit 44. By way of example, the pickup current I1 may equal 1.15 $I_{rated}$. Once the peak instantaneous current in distribution circuit 30 has reached the pickup level I1, long time delay circuit 22 begins timing the duration of the overcurrent and generates a trip signal whenever the overcurrent exists for an amount of time which varies inversely with the magnitude of the overcurrent and which is specifically determined by the inverse time current characteristics of curve 32.

Figure 3:
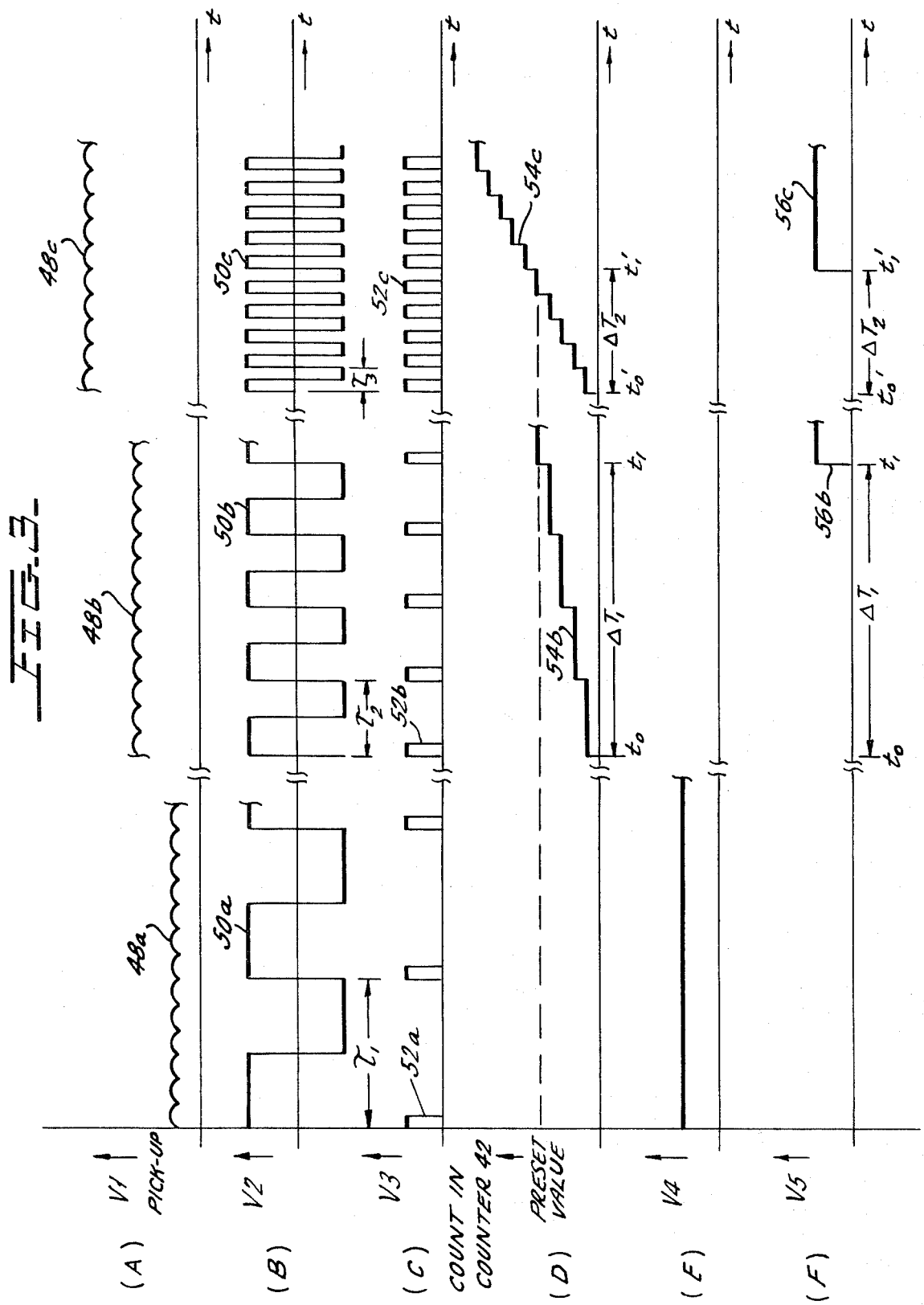
FIGS. 3A–3F illustrates wave forms appearing at various points in the block diagram of FIG. 1.

The operation of long time delay circuit 22 can best be understood with reference to FIG. 3. FIG. 3A illustrates the magnitude of the peak line current signal V1 for three different peak current levels in distribution circuit 30. The first signal level 48a represents the output of input circuit 12 when the maximum current in distribution circuit lies below the pickup value I1. The second signal level 48b represents the output of input circuit 12 when the peak current in distribution circuit 30 is slightly above the pickup current I1. The third signal level 48c represents the magnitude of the output of input circuit 12 when the peak current in distribution circuit 30 is substantially higher than the pickup current I1 but still below current I2.

The graph of FIG. 3B represents the output of square wave generator 38 for the three exemplary signal levels of peak line current signal V1. As shown therein, square wave generator 38 generates a square wave having a predetermined magnitude and period which varies inversely as a function of the magnitude of the signal V1 and therefore with the magnitude of the peak current in distribution circuit 30. More particularly, the period of the square wave generated by square wave generator 38 varies as an inverse function of the peak magnitude of the current in distribution circuit 30 in accordance with the inverse time current relationship illustrated by curve 32 of FIG. 2. As a result, the period $\tau_1$ of square wave 50a is greater than that of square wave 50b, and the period $\tau_2$ of square wave 50b is greater than that ($\tau_3$) of square wave 50c.

The square wave generated by square wave generator 38 is applied to pulse generator 40 (FIG. 1) which generates a single pulse of predetermined height and duration each time there is a positive transition of the square wave generated by square wave generator 58. This output is illustrated in FIG. 3C. The pulses 52a illustrate the output of pulse generator 40 when square wave generator 38 generates the square wave 50a of FIG. 3B. The pulses 52b illustrate the output of pulse generator 40 when square wave generator 38 generates the square wave 50b of FIG. 3B. Finally, the pulses 52c illustrate the output of pulse generator 40 when square wave generator 38 generates the square wave 50c of FIG. 3B. As clearly seen in FIG. 3c, the frequency of the pulses generated by pulse generator 40 varies as a direct function of the magnitude of the peak line current signal V1 generated by input circuit 12 and therefore as a direct function of the magnitude of the peak instantaneous current in distribution circuit 30. More particularly, the frequency of the pulses generated by pulse generator 40 varies as a direct function of the magnitude of the peak instantaneous current in distribution circuit 30 in accordance with the inverse of the time-current characteristic illustrated by curve 32 of FIG. 2.

The pulses generated by pulse generator 40 are applied to the count input of counter 42. Counter 42 also receives a disable signal from pickup circuit 44. Pickup circuit 44 monitors the level of the peak line current signal V1 and generates a disable signal V4 whenever the signal V1 indicates that the peak instantaneous current in distribution circuit 30 is below the pickup current I1.

As along as the peak instantaneous current in distribution circuit 30 remains below the pickup value I1 (e.g., 48a in FIG. 3A), pickup circuit 44 generates a disable signal V4 at its output and applies this disabled signal to counter 42. (Disable signal V4 is illustrated at 55a of FIG. 3E.) As a result, counter 42 will not count the number of pulses applied to its count input terminal by pulse generator V3 and long time delay circuit 22 will not generate a trip signal at its output 46.

When the magnitude of the peak instantaneous current in line 30 rises above the pickup current I1, pickup circuit 44 no longer generates a disable signal at its output and counter 42 is permitted to count the number of pulses generated by pulse generator 40. When the count in counter 42 reaches a value determined by the preset input thereto, counter 42 generates a trip signal at its output 46. The amount of time it takes for the count in counter 42 to reach the preset value is determined by the frequency of the pulses generated by counter 42. Since the frequency of these pulses vary as a direct function of the magnitude of the peak instantaneous current in circuit 30 in accordance with the transfer characteristics of curve 32 of FIG. 2, the time it takes for the count in counter 42 to reach preset value also varies as a direct function thereof. This relationship may be best understood by examining the operation of circuit 22 for the two signal levels 48b and 48c of the peak line current signal V1 generated by input circuit 12.

As noted above, signal level 48b (FIG. 3) represents the magnitude of the peak line current signal V1, generated by input circuit 12 (FIG. 1) when the peak instantaneous current in line 30 is slightly above the pickup current I1. In this condition, the pulses generated by pulse generator 40 are shown at 52b of FIG. 3C. These pulses are applied to counter 42 and cause the count in counter 42 to increase in the manner illustrated at 54b of FIG. 3D. As shown therein, the count in counter 42 will each the preset value at the end of a time interval $\Delta$ T1 which begins at the instant $t_o$ at which the peak instantaneous current in distribution circuit 30 rises above the pickup level I1. At the end of this interval (at time $t_1$), counter 42 generates a trip signal 56b as shown in FIG. 3F.

Signal level 48c represents the magnitude of the peak line current signal V1 generated by input circuit 12 when the peak instantaneous current in distribution circuit 30 is substantially above the pickup current I1 but still below the current I2. In this instance, the frequency of the pulses 52c (FIG. 3c) generated by pulse generator 40 is substantially greater than the frequency of the pulses 52b. As a result, the count in counter 42 to reach the preset value in a relatively short time period $\Delta$ T2 as illustrated in FIG. 3d. At the end of this interva (at $t_1'$), long time delay circuit 22 generates a trip signal 56c at its output 46.

Figure 2:
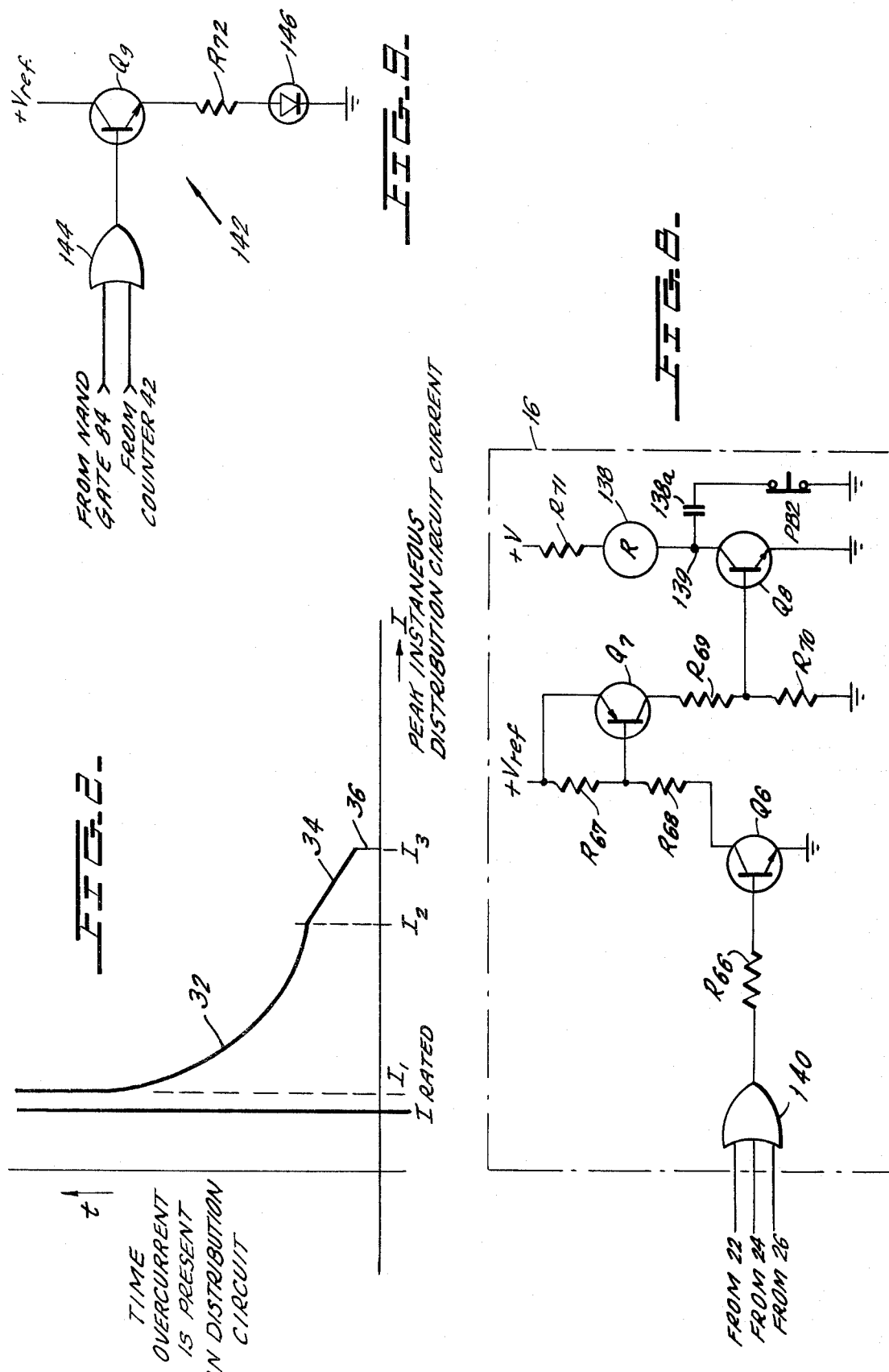
FIG. 2 is a graph of an exemplary time-current characteristic curve of the realy of the present invention.

As made clear by the foregoing, the time interval $\Delta$ T which an over current condition must exist for long time delay circuit 22 to generate a trip signal varies as a direct function of the magnitude of the peak instantaneous circuit in line 30 in accordance with the transfer characteristics of curve 32 of FIG. 2.

When the peak instantaneous magnitude of current in distribution circuit 30 rises above the current level I2, short time delay circuit 24 is enabled and generate a trip signal at its output after a time delay determined by the time relationship illustrated by curve 34 of FIG. 2. Finally, when the magnitude of the peak instantaneous current in distribution circuit 30 reaches the third current value I3, instantaneous circuit 26 instantaneously generate a trip circuit at its output.

The trip signals generated by three circuits 22-26 of timing circuit 14 are applied to line interrupter circuit 16 which is magnetically coupled to contact mechanism 18. Line interrupter circuit 16 causes contact mechanism 18 to open all three lines L1, L2 and L3 whenever a trip signal is applied thereto.

INPUT CIRCUIT

Figure 4:
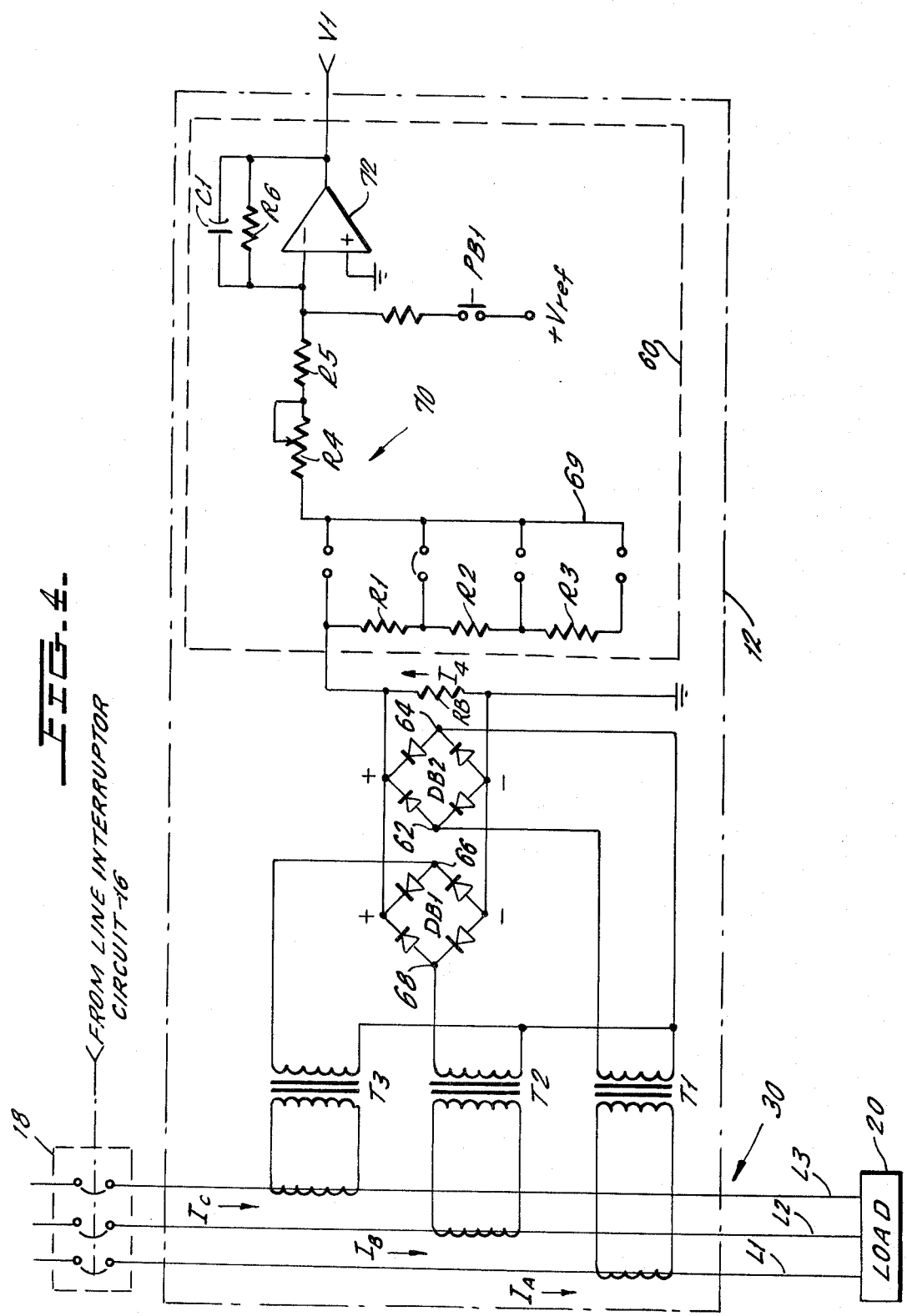
FIG. 4 is a circuit diagram of an input circuit which may be utilized in connection with the present invention.

One suitable input circuit 12 is illustrated in FIG. 4. As illustrated therein, input circuit 12 includes a plurality of current transformers T1, T2 and T3, a pair of diode bridges DB1, DB2, a burden resistor $R_B$ and an inverter circuit 60. The primary winding of each transformer T1, T2 and T3 is magnetically coupled to different power line L1, L2 and L3, A flux proportional to the instantaneous value of the current $I_a$ in line L1 is induced in the core of transformer T1; a flux proportional to the instantaneous value of the current $I_b$ in line L2 is induced in the core of transformer T3; and flux proportional to the instantaneous value of the current $I_c$ in line L3 is induced in the core of transformer T3.

Each of the secondary windings of transformers T1, T2 and T3 are coupled to different a.c. terminals of the diode bridge pair DB1, DB2. The opposite terminals of the secondary winding of transformer T1 are connected to terminals 62 and 64, respectively, of diode bridge DB2. The opposite terminals of the secondary winding of transformer T2 are coupled to terminal 68 of diode bridge DB1 and terminal 64 of diode bridge DB2, respectively. The opposite terminals of the secondary winding of transformer T3 are coupled to terminal 66 of diode bridge DB1 and terminal 64 of diode bridge DB2, respectively. The two diode bridges DB1, DB2 are coupled in parallel with their DC output coupled across burden resistor RB. So connected, the diode bridge pair DB1, DB2 induce a current I4 through burden resistor $R_B$ which current is proportional to the peak instantaneous current in the distribution circuit 30. Current I4 is applied to inverter circuit 60 which generates the output signal V1. Inverter circuit 60 comprises a resistor network 70 and an operational amplifier (hereinafter OpAmp) 72 connected to operate as an inverter. A feedback resistor R6 is coupled between the output and inverting input terminal of OpAmp 72. The non-inverting input terminal of OpAmp 72 is coupled to ground. A filter capacitor C1 is coupled in parallel with resistor R6.

Resistor network 70 comprises resistors R1-R5 and serves to define the proportionality between the magnitude of the peak instantaneous current in circuit 30 and the magnitude of the peak line current signal V1. Any desired number of the series connected resistors R1, R2 and R3 may be connected in series with resistors R4 and R5 by making an appropriate connection to bus 69. By way of example, a connection is shown between the node separating resistor R1 and R2 and bus 69. By selecting the number of resistors R1-R3 which are connected in series with resistor R4 and resistor R5, a gross adjustment may be made between the magnitude of the peak instantaneous current in circuit 30 and the peak line current signal V1. A fine adjustment of this ratio may be made by adjusting the slide arm of variable resistor R4. It should be noted at this time that since input circuit 12 includes an inverter circuit 60 the wave form of the peak line current signal V1 is the inverse of that illustrated by way of example of FIG. 3a.

A test push button switch PB1 is coupled between a reference voltage Vref and resistor R7. When push button switch PB1 is depressed, a relatively high current is applied to the non-inverting terminal of OpAmp 72 via resistor R7 sending the peak line current V1 of the input circuit 12 to a relatively high negative level. This level is sufficiently great to cause timing circuit 14 to generate a trip signal at its output 28 thereby causing line interrupter circuit 16 to open contact mechanism 18.

LONG TIME DELAY CIRCUIT

A suitable long time delay circuit 22 is illustrated in FIG. 5. As shown therein, square wave generator 38 comprises resistors R9-R23, capacitors C2-C4, OpAmps 72-76, switching transistor Q1-Q2 and NAND gates 80-82. Square wave generator 38 receives the peak line current signal V1 generated by input circuit 12 and generates the desired square wave output at its output 79. The signal V1 is applied to the inverting input terminal of OpAmp 72 via resistor R9. The non-inverting input terminal of OpAmp 72 receives a second input from OpAmp 74 via diode D2 and resistor R11.

The desired time current characteristic of long time delay circuit 22 (curve 32 of FIG. 2) is obtained from a multi-node RC circuit connected as a feed back element of operational amplifier 72. In the example illustrated, the multi-node RC circuit comprises three RC pairs; R13-C2, R14-C3 and R15-C4. While three RC pairs are shown, the number of pairs may be increased or decreased depending upon the range and shape of the desired time-current curve. In the example shown, the transfer function of OpAmp 72 is:

$$\frac{V_{out}}{V_{in}} = \frac{1}{R0}\left[\frac{1}{C_2(S+a_1)} + \frac{1}{C_3(S+a_2)} + \frac{1}{C_4(S+a_3)}\right] \quad (1)$$

wherein $a_1 = 1/R13 \cdot C2$, $a_2 = 1/R14 \cdot C3$, $a_3 = 1/R15 \cdot C4$ and S is the Laplace operator.

As a result, the response to the DC input to OpAmp 72 is:

$$\frac{V_{out}}{V_{in}} = \frac{1}{R9}[R13(1 - e^{-a_1 t}) + R14(1 - e^{-a_2 t}) + R15(1 - e^{-a_3 t})] \quad (2)$$

The foregoing transfer function is the same form of response obtained from the circuit disclosed in U.S. Pat. No. 3,319,127, the disclosure of which is incorporated herein by reference. As stated in the foregoing patent, this transfer function approximates that of a thermal breaker over a wide range of time (t). This transfer function is shown graphically at 32 of FIG. 2.

The output of OpAmp 72 is applied to the noninverting input terminal of OpAmp 76 via resistor R16. The non-inverting terminal of OpAmp 76 also receives an input from the reference voltage Vref via resistors R17 and R18. Resistor R18 is preferably variable to provide a calibration trim.

OpAmp 76 is connected to operate as a comparator and will generate its positive or negative saturation voltage at its output as a function of the effective voltage applied to its inverting input terminal. Particularly, if the effective voltage into its inverting terminal is positive, its output will jump to its negative saturation value. Conversely, if the effective voltage applied into its inverting input terminal is negative, its output will jump to its positive saturation value.

The output of OpAmp 76 is fed to junction 78 via resistor R21. Summing junction 78 also receives a biasing voltage from the reference voltage Vref via resistor R20. The magnitudes of resistors R20 and R21 are chosen such that the voltage at summing junction 78 will be zero volts DC when the output of OpAmp 76 is at its negative saturation value (i.e. when the effective voltage applied to its inverting input terminal is positive). The voltage at junction 78 is applied to the base of transistor Q1 (via resistor R19) and to the input terminals of NAND gate 80. When the output of OpAmp 76 is at its negative saturation value, the voltage at junction 78 is zero volts DC and transistor Q1 is off. In this condition a positive voltage is applied to the inverting input terminal of Op-Amp 76 via resistors R17 and R18. When the output of OpAmp 76 goes positive, voltage at junction 78 will be positive and transistor Q2 will turn on clamping node 82 to ground. In this condition, the reference voltage Vref is cut off from OpAmp 76.

NAND gates 80 and 84 act as a buffer between OpAmp 76 and both OpAmp 74 and transistor Q2. When summing junction 78 is at zero volts DC, the output of NAND gate 80 is at a predetermined positive value corresponding to a binary "high" and the output of NAND gate 84 is at zero volts DC (corresponding to a binary "low"). The zero volts at the output of NAND gate 84 is applied to both the base of transistor Q2 (via resistor R22) and the inverting input terminal of OpAmp 74 (via resistor R22). In this condition, transistor Q2 is off and OpAmp 74 is driven by the peak line current voltage V1 applied to its inverting input terminal via resistor R8. The peak line current voltage V1 is inverted by OpAmp 74 (which is connected to operate as an inverting amplifier) and is applied as a positive voltage to node 88. This positive voltage forward biases diode D2 and is applied to the inverting input of OpAmp 72 via diode D2 and resistor R11.

When the output of OpAmp 76 is at its positive saturation value, the voltage at node 78 is at some positive value and the output of NAND gate 80 will be zero volts DC. The zero volts at the output of NAND gate 80 is applied to the input of NAND gate 84 causing the output of NAND gate 84 to jump to a predetermined positive value (a binary "high"). The positive voltage at the output of NAND gate 84 is applied to the base of transistor Q2 via resistor R22 and to the inverting input terminal of OpAmp 74. The values of resistors R8 and R23 are chosen such that when the output of NAND gate 84 is positive, the effective voltage applied to the inverting input terminal of OpAmp 74 is also positive. Since OpAmp 74 is connected to operate as an inverting amplifier, a positive voltage proportional to the effective voltage applied to the inverting input of OpAmp 74 appears at the output of OpAmp 74. This negative voltage back biases diode D2. As noted above, the positive voltage at the output of NAND gate 84 is also applied to the base of transistor Q2. This positive voltage turns transistor Q2 on and clamps node 86 to ground. So biased, the inverting input of OpAmp 72 is fed by voltage V1 only.

The operation of square wave generator 38 will now be described. For the purpose of explanation, it will be assumed that the output of OpAmp 72 starts at zero volts DC. In this condition, a positive current is fed to the inverting input terminal of OpAmp 76 via resistors R17 and R18. As a result, the output of OpAmp 76 will be at its negative saturation value and summing junction 78 will be at zero volts DC. The zero volts at junction 78 is applied to the inputs of NAND gate 80 causing the output of NAND gate 80 to go "high" and the output of NAND gate 84 to go to zero volts DC. With zero volts at the output of NAND gate 84, transistor Q2 is biased off and the peak line current voltage V1 is inverted by OpAmp 74 and applied to node 88. This positive voltage forward biases diode D2 and feeds the inverting input terminal of OpAmp 72 via transistor R11. The magnitude of resistor R11 is chosen to be less (preferably half) than that of resistor R9. Accordingly, an effective positive voltage is applied to the inverting input terminal of OpAmp 72.

The positive input of OpAmp 72 causes capacitors C2 through C4 to charge and the output of OpAmp 72 goes negative according to the exponential curve determined by Equation (2). When the magnitude of the negative voltage at the output of OpAmp 72 becomes sufficiently great to over-come the positive voltage Vref, an effective negative current will be applied to the inverting input terminal of OpAmp 76 causing its output to jump to the positive saturation value. In this condition, the voltage at summing junction 78 is positive and transistor Q1 clamps node 82 to ground. This ensures that the output of OpAmp 76 remains at its positive value until the voltage at the output of OpAmp 72 returns to zero volts DC.

The positive voltage at junction 78 causes the output of NAND gate 80 to return to zero volts DC and the output of NAND gate 84 to go "high". The "high" at the output of NAND gate 84 turns transistor Q2 on and clamps node 86 to ground. In this condition, OpAmp 72 receives the negative input voltage V1 only and capacitors C2–C4 begin discharging in accordance with the exponential curve of Equation 2. When the output of OpAmp 72 returns to zero volts DC, the output of OpAmp 76 jumps to its predetermined negative value and the entire process is repeated.

It can be seen from the foregoing, that the voltage at summing junction 78 jumps between a predetermined positive value and zero volts DC with a frequency determined by the magnitude of the input voltage V1 generated by input circuit 12. As a result, the voltage at node 78 defines a square wave whose period varies as an inverse function of the magnitude of peak line current signal V1 and therefore as an inverse function of the peak instantaneous current in power distribution circuit 30 in accordance with the predetermined characteristic curve determined by the RC feed back network of OpAmp 72. It should be recognized at this point that while generator 38 has been described as a square wave generator, it is possible to generate a non-symmetrical output waveform which retains the desired inverse characteristic between the period of the output signal and the magnitude of the peak line current signal V1. By way of example, such result could be obtained by varying the magnitude of resistors R9 and R11 to some ratio other than 2:1.

The square wave generated by square wave generator 38 is applied to pulse generator 40 which comprises NAND gates 90, 194, RC circuit 92 and OpAmp 96. The square wave generated by generator 78 is applied to both input terminals of NAND gate 90. The output of NAND gate 90 is applied to RC circuit 92 which comprises a capacitor C5 and resistors R24, R25. The output of RC circuit 92 is applied to both inputs of NAND gate 94 whose output is applied to the non-inverting input terminals of OpAmp 96 (via resistor R26). The inverting input terminal of operational amplifier 96 receives a constant biasing potential determined by magnitude of resistors R27 and R28. OpAmp 96 is connected to operate as a comparator.

When the output of square wave generator 38 is at its predetermined positive value, the output of NAND gate 90 jumps to zero volts DC. The zero volts is initially applied to the input of NAND gate 94 causing its output to jump to a positive predetermined value (a binary "high"). As a result, the output of OpAmp 96 jumps to its positive saturation value and forward biases diode D3. The output of NAND gate 94 (and therefore the output of OpAmp 96) will remain positive until the voltage across capacitor C5 is sufficiently great to trigger NAND gate 94. At this time, the output of NAND gate 94 jumps to zero volts DC and the output of OpAmp 96 jumps to its negative saturation value. This negative voltage back biases diode D3 causing the output of pulse generator 40 to jump to zero volts DC. As a result of the foregoing, pulse generator 40 generates an output pulse having a predetermined magnitude and a pulse width determined by the time constant of RC circuit 92 each time there is a positive transition of the square wave generated by generator 38. Resistor R25 is preferably a variable resistor in order that the duration of the pulses generated by pulse generator 40 may be adjusted.

Pickup circuit 44 includes a comparator circuit 98, a disable signal generator 100 and a switching transistor Q3. Comparator circuit 98 comprises resistors R29–R31 and OpAmp 102. OpAmp 102 is connected to operate as a comparator. The inverting input terminal of OpAmp 102 receives a first input signal Vref via resistors R30 and R31 and a second signal (peak line current voltage) V1 via resistor R29. As long as the magnitude of the negative peak line current voltage V1 remains below a preset value determined by the slide arm of potentiometer R31, the effective current into the inverting input terminal of OpAmp 102 is positive and the output of OpAmp 102 is at its negative saturation value. When the magnitude of the negative signal V1 becomes sufficiently great to overcome the positive reference voltage Vref, the effective voltage applied to the inverting input of OpAmp 102 will be negative and the output of OpAmp 102 will jump to its positive saturation value. By adjusting the side arm of variable resistor R31, it is possible to adjust the magnitudes of the peak line current voltage V1 (and therefore the magnitude of the peak instantaneous current in distribution circuit 30) which is required to initiate operation of long time delay circuit 22. With particular reference to FIG. 2, the position of the slide arm of resistor R31 determines the particular value of the pickup current I1.

The output of comparator 102 is applied to the base of transistor Q3 via resistor R32. The magnitude of resistors R32 and R33 are chosen such that zero volts DC is applied to the base of transistor Q3 whenever the output of comparator 102 is at its negative saturation value. When the output of comparator 102 is at its positive saturation value, a positive voltage is applied to the base of transistor Q3 and transistor Q3 is turned on.

Disable signal generator 100 comprises resistors R34–R38, diodes D4–D6, capacitor C6 and OpAmp 104. Disable signal generator 100 generates a negative going pulse train at its output whenever capacitor C6 is not shorted by transistor Q3. Accordingly, disable signal generator 100 generates a negative going pulse train (the disable signal) whenever the magnitude of the peak instantaneous current in distribution circuit 30 is below the pickup value I1. Whenever the peak instantaneous value of the current in distribution circuit 30 is above the pickup value I1, the output of OpAmp 104 will be positive and diode D6 will be back biased. It should be noted at this time that the disable is a negative going pulse train which serves to discharge capacitor C7 in a step like manner. As such, disable signal generator 100 discharges any charge added to capacitor C7 by pulse generator 40. The disable signal can take any other appropriate form such as ground.

Counter circuit 42 comprises an RC circuit 106 and a comparator circuit 108 and generates a trip signal at its output 110 whenever the voltage across capacitor C7 reaches a preset value determined by the slide arm of potentiometer R42. RC circuit 106 comprises variable resistor R39, resistor R40 and capacitor C7 and effectively counts the number of pulses generated by pulse generator 40 whenever the peak instantaneous current in distributor circuit 30 is above the pickup current I1. Comparator circuit 108 comprises resistors R41–R43 and OpAmp 114. OpAmp 114 is coupled to operate as a comparator and will generate its positive or negative saturation value at its output as a function of the magnitude of the two voltages applied to its non-inverting and inverting input terminals, respectively. Capacitor C7 of RC circuit 106 accumulates the charge supplied by the positive going pulses generated by pulse generator 40 whenever pickup circuit 44 does not generate a disabled signal. While the output pulses generated by pulse generator 40 are always applied to capacitor C7, they are not permitted to accumulate whenever the peak instantaneous current in distribution circuit is below the pickup value I1 since the capacitor is constantly being discharged by the negative going pulses generated by pickup circuit 44. When pickup circuit 44 stops generating the disable signal, the positive going pulses generated by pulse generator 40 are permitted to accumulate across capacitor C7 thereby increasing the voltage at node 112. The voltage at node 112 is compared to preset value determined by the position of the slide arm of resistor R42 by OpAmp 114. When the charge across capacitor C7 reaches the present value, the output of OpAmp 114 jumps to its positive saturation value. This output represents the trip signal output of long time delay circuit 22.

SHORT TIME DELAY CIRCUIT

One possible short time delay circuit 24 is illustrated in FIG. 6. As shown therein, short time delay circuit 24 includes an input section 116, an integrator section 118 and a comparator section 120. Input section 116 comprises resistors R44–R51 and OpAmps 122, 124. The inverting input terminal of OpAmp 122 receives both the negative input signal V1 and the positive reference voltage Vref. OpAmp 122 is connected to operate as a comparator. The magnitude of resistors R44 and R45 are chosen such that the effective voltage applied to the inverting imput terminal of OpAmp 122 is positive whenever the peak instanteous current in distribution circuit 30 is below current I2 (see FIG. 2). This causes the output of OpAmp 122 to switch to its negative saturation current which is applied to the input of integrator 118 via the forward biased diode D7.

The peak line current signal V1 is also applied to the inverting terminal of OpAmp 124. A feed back resistor R49 is coupled between the output and inverting input terminal of OpAmp 124 causing OpAmp 124 to operate as an inverting amplifier. A second input signal Vref is applied to the inverting input terminal of OpAmp 124 via resistor R48. The magnitude of resistors R47 and R48 are chosen such that the effective voltage applied to the inverting input terminal of OpAmp 124 is negative whenever the peak instanteous current in distribution circuit 30 is substantially below the current I2. As a result, OpAmp 124 generates a positive signal at its output whose magnitude is proporational to the peak instantaneous current in circuit 30 well before the peak instantaneous current reaches the value I2. Integrator 118 comprises resistors R49–R51, diode D8, capacitor C8 and OpAmp 126. OpAmp 126 is coupled to operate as an integrator and integrates the effective voltage applied to its non-inverting input terminal. The relative values of resistors R49–R51 are chosen such that a positive effective voltage is applied to the non-inverting input terminal of comparator 126 whenever the output of OpAmp 122 is at its negative saturation value. This relationship may be carefully calibrated with the aid of variable resistor R51. As a result of the foregoing relationship, the output of OpAmp 126 will be positive as long as the peak instantaneous current in distribution circuit 30 is below the value I2.

When the peak instantaneous current in distribution circuit 30 rises above the value I2, the output of OpAmp 122 jumps to its positive saturation value and diode D7 is back biased. As a result, the positive voltage at the output of OpAmp 124 is the only effective input to integrator 126 and the output of integrator 126 decreases at a rate determined by resistors R50, R51 and capacitor C8.

Comparator section 120 comprises resistors R52–56, capacitor C9 and OpAmp 128. OpAmp 128 is coupled to operate as a comparator. As long as the effective voltage applied to the non-inverting input terminal of OpAmp 128 is positive, the output of OpAmp 128 will remain at its negative saturation value. The value of resistors R55 and R56 are chosen such that the negative saturation voltage at the output of OpAmp 128 develops zero volts DC at node 30. Capacitor C9 protects against transient voltages. When the effective voltage into the inverting input terminal of OpAmp 128 becomes negative, the output of OpAmp 128 becomes positive and comparator 120 generates a positive going trip signal.

The magnitude of resistors R52-R54 are chosen such that the effective voltage into the inverting input terminal of OpAmp 128 remains positive until the output of OpAmp 126 reaches a predetermined negative value. This relationship may be adjusted by adjusting the slide arm of variable resistor R54 and defines, in combination, with the transfer characteristic of integrator 118, the particular parameters of curve 34 in FIG. 2.

INSTANTANEOUS CIRCUIT

One suitable instantaneous circuit 26 is illustrated in FIG. 7. As shown therein, instantaneous circuit 26 comprises resistors R57-R65, capacitor C10, OpAmps 132, 134 and switching transistor Q5. OpAmp 132 is coupled to operate as a comparator whose output jumps between its positive and a negative saturation value as the function of the effective voltage applied to its inverting terminal. The inverting input terminal of OpAmp 132 receives the negative peal line current voltage V1 via a resistor R57 and a positive input voltage Vref via resistor R58. When the slide arm of variable resistor R57 is properly adjusted, the output of OpAmp 132 will stay at its negative saturation value whenever the peak instantaneous current in circuit 30 is below the instantaneous trip current 13 and will jump to its positive saturation value whenever the peak instantaneous current in circuit 30 reaches the instantaneous trip current 13.

The magnitude of resistors R59 and R60 are chosen such that zero volts DC is applied to the base of transistor Q5 whenever the output of OpAmp 132 is at its negative saturation value. As a result, transistor Q5 will be off whenever the peak instantaneous current in circuit 30 is below the instantaneous trip current I3.

When transistor Q5 is off, the inverting input terminal of OpAmp 134 receives the reference voltage Vref via resistor R61. The non-inverting input terminal of OpAmp 134 always receives a portion of the reference voltage Vref, determined by voltage divider R62, R63. Since OpAmp 134 is connected to operate as a comparator, the output of OpAmp 134 is at its negative saturation value whenever the peak instantaneous current in distribution circuit 30 is below the instantaneous trip current I3. The magnitude of resistors R64 and R65 are selected such that zero volts DC appears at node 36 whenever the output of OpAmp 134 is at its negative saturation value. Capacitor C10 protects against transient voltages.

When the peak instantaneous current in circuit 30 reaches the instantaneous trip value 13, the output of OpAmp 132 jumps to its positive saturation value and transistor Q5 clamps the inverting terminal of OpAmp 134 to ground. As a result, the output of OpAmp 134 jumps to its positive saturation value and node 136 jumps to a positive value representative of a trip signal.

LINE INTERRUPTER CIRCUIT

One possible line interrupter circuit is illustrated in FIG. 8. As shown therein, line interrupter circuit 16 comprises resistors R66-R71, switching transistors Q6-Q8, relay 138 and OR gate 140. The outputs of circuits 22-26 are applied to respective input terminals or OR gate 140 which generates a positive voltage (a binary "high") and its output whenever any of the circuits 22-26 generate a trip signal. The output of OR gate 140 is applied to the base of transistor Q6. When OR gate 140 generates a positive going output (a trip signal), transistor Q6 is turned on permitting current to flow through resistors R67 and R68. The voltage drop across resistor R67 biases transistor Q7 on and permits current to flow through resistors R69 and R70. The voltage across resistor R70 is applied to the base of transistor Q8 and turns transistor Q8 on. When transistor Q8 is turned on, current flows through relay 138 which is magnetically coupled to contact mechanism 18 and causes contact mechanism 18 to open each of lines of power distribution circuit 30.

Relay 138 is also magnetically coupled to contact 138a. When relay 138 is energized by the voltage +V, contact 138a is closed and node 139 is grounded via contact 138a and normally closed push button switch PB2. As a result, relay 138 is latched on whenever a trip signal is generated by timing circuit 14. To reset line interruptor circuit 16, and thereby close contact mechanism 18, push button switch PB2 must be depressed.

INDICATOR CIRCUIT

Indicator circuit 142 includes an OR gate 144, a switching transistor Q9, resistor R72 and photodiode 146. One input of OR gate 144 is coupled to the output of NAND gate 84 of square wave generator 38. The remaining input of OR gate 144 is connected to the output of counter 42. As a result, if square wave generator 38 is operating properly, a positive going pulse having a frequency equal to that of the square wave generated by square wave generator 38 will appear at the output of OR gate 144 whenever long time delay circuit 22 has not generated a trip signal. The positive going pulse train appearing at the output of OR gate 144 is applied to the base of transistor Q9 so as to intermittently complete a circuit between the positive reference voltage Vref and the photodiode 146. As a result, whenever square wave generator is operating properly, photodiode 146 will flash on and off providing a visual indication of the proper operation of long time delay circuit 22.

When long time delay circuit 22 generates a trip signal, a steady positive voltage appears at the output of NAND gate 144 driving transistor Q9 on. As a result, photodiode 146 will stop flashing and will stay on. This provides a visual indication that the trip signal has been generated and that the contact mechanism 18 has been opened.

The present invention may be embodied in other specific forms without departing from the spirit or essential attributes thereof and, accordingly, reference should be made to the appended claims, rather than to the foregoing specification, as indicating the scope of the invention.

What is claimed is:

1. A solid state relay for interrupting current flow in a power distribution circuit, comprising:
   (A) input circuit means for generating a peak line current signal representative of the peak instantaneous current in said power distribution circuit;
   (B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
(1) square wave generator means responsive to said peak line current signal for generating a square wave whose period varies inversely with the magnitude of said peak instantaneous current in said distribution circuit;
(2) trip signal generating means responsive to said square wave for generating said first trip signal when the magnitude of said peak instantaneous time current rises above said pick-up value I1 for a time period which varies as an inverse function of the magnitude of said peak instantaneous current and which is determined by a first predetermined time-current characteristic curve which defines the desired operating characteristic of said relay over a first current range extending between said selected pick-up current I1 and a higher current; said trip signal generating means comprising pulse generator means responsive to said square wave for generating a pulse train having a frequency which varies as a direct function of the magnitude of said peak instantaneous current in said distribution circuit; said pulse generator means generating a single pulse of predetermined height and duration once during each period of said square wave, and said trip signal generating means further comprising means responsive to said pulse train for generating said first trip signal; and
(C) circuit interrupter means for interrupting current flow in said power distribution circuit responsive to the generation of said first trip signal by said long time delay circuit means.

2. The solid state relay of claim 1, wherein said trip signal generating means comprises:
(A) pick-up circuit means responsive to said peak line current signal for generating a disable signal whenever the magnitude of said peak instantaneous current is less than said selected pick-up value I1; and
(B) counter circuit means for generating said first trip signal when said pulse generator circuit generates a predetermined number of pulses during a period of time when said pick-up circuit means does not generate said disable signal.

3. The solid state relay of claim 1 further comprising:
(A) short time delay circuit means responsive to said peak line current signal for generating a second trip signal when the magnitude of said peak instantaneous current in said distribution circuit rises above said current I2 for a time period which varies as an inverse function of the magnitude of said peak instantaneous current and which is determined by a second predetermined time-current characteristic curve which defines the desired operating characteristic of said relay over a second current range extending between said current I2 and a higher current I3, and
(B) instantaneous circuit means responsive to said peak line current signal for generating a third trip signal when the magnitude of said peak instantaneous current in said power distribution signal equals said current I3, said circuit interruptor means also for interrupting current flow in said power distribution circuit responsive to the generation of said second trip signal by said short time delay circuit means and also responsive to the generation of said third trip signal by said instantaneous circuit means.

4. The solid state relay of claim 1 further including means for indicating that said square wave circuit means is functioning properly.

5. A solid state relay for interrupting current flow in a power distribution circuit, comprising:
(A) input circuit means for generating a peak line current signal representative of the peak instantaneous current in said power distribution circuit;
(B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
(1) pulse generator means responsive to said peak line current signal for generating a pulse train having a frequency which varies as a direct function of the magnitude of said peak instantaneous current in said distribution circuit, the frequency of said pulse train being determined by a first predetermined time-current characteristic curve which defines the desired operating characteristic of said relay over a first current range extending between said selected pick up current I1 and a higher current I2;
(2) pick-up circuit means responsive to said peak line current current signal for generating a disable signal whenever the magnitude of said peak instantaneous current is less than said selected pick-up value I1, said disable signal being a pulse train having a polarity which is opposite to the polarity of said pulse train generated by said pulse generator means; and
(3) counter circuit means for generating said first trip signal when said pulse generator circuit generates a predetermined number of pulses during a period of time when said pick-up circuit means does not generate said disable signal, said counter circuit means comprising an RC circuit and a comparator, said RC circuit including a capacitor which receives both said pulse train generated by said pulse generator means and said disable signal generated by said pick-up circuit means, and said comparator being for comparing the voltage across said capacitor to a preset value and for generating said first trip signal when said voltage across said capacitor reaches said preset value; and
(C) circuit interrupter means for interrupting current flow in said power distribution circuit responsive to the generation of said first trip signal by said long time delay circuit means.

6. A solid state relay for interrupting current flow in a power distribution circuit, comprising:
(A) input circuit means for generating a peak line current signal representative of the peak instantaneous current in said power distribution circuit;
(B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
 (1) square wave generator means responsive to said peak line current signal for generating a square wave whose period varies inversely with the magnitude of said peak instantaneous current in said distribution circuit;
 (2) pulse generator means responsive to said square wave for generating a pulse train having a frequency which varies as a direct function of the magnitude of said peak instantaneous current in said distribution circuit;
 (3) pick-up circuit means responsive to said peak line current signal for generating a disable signal whenever the magnitude of said peak instantaneous current is less than said selected pick-up value I1;
 (4) counter circuit means for generating said first trip signal when said pulse generator circuit generates a predetermined number of pulses during a period of time when said pick-up circuit means does not generate said disable signal, said counter circuit means comprising an RC circuit and a comparator, said RC circuit including a capacitor which receives both said pulse train generators by said pulse generator means and said disable signal generated by said pick-up circuit means, and said comparator being for comparing the voltage across said capacitor to a preset value and for generating said first trip signal when said voltage across said capacitor reaches said preset value; and
 (C) circuit interrupter means for interrupting current flow in said power distribution circuit responsive to the generation of said first trip signal by said long time delay circuit means.

7. The solid state relay of claim 2, wherein said counter circuit means comprises:
 (A) an RC circuit including a capacitor which receives both said pulse train generated by said pulse generator means and said disable signal generated by said pickup circuit means; and
 (B) a comparator for comparing the voltage across said capacitor to a preset value and for generating said first trip signal when said voltage across said capacitor reaches said preset value.

8. The solid state relay of claim 4 or 6 further including means for adjusting said preset value.

9. The solid state relay of claim 4 or 6 wherein said disable signal is a pulse train having a polarity which is opposite to the polarity of said pulse train generated by said pulse generator means.

10. A solid state relay for interrupting current flow in a power distribution circuit, comprising:
 (A) input circuit means for generating a peak line current signal representative of the peak instantaneous current in said power distribution circuit;
 (B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
 (1) square wave generator means responsive to said peak line current signal for generating a square wave whose period varies inversely with the magnitude of said peak instantaneous current in said distribution circuit, the period of said square wave varying as a function of the magnitude of said peak instantaneous line current in accordance with a predetermined characteristic curve which is determined by a multi-node RC element in the feedback loop of an operational amplifier forming part of said square wave generator;
 (2) pulse generator means responsive to said square wave for generating a pulse train having a frequency which varies as a direct function of the magnitude of said peak instantaneous current in said distribution circuit;
 (3) pick-up circuit means responsive to said peak line current signal for generating a disable signal whenever the magnitude of said peak instantaneous current is less than said selected pick-up value I1; and
 (4) counter circuit means for generating said first trip signal when said pulse generator circuit generates a predetermined number of pulses during a period of time when said pick-up circuit means does not generate said disable signal; and
 (C) circuit interrupter means for interrupting current flow in said power distribution circuit responsive to the generation of said first trip signal by said long time delay circuit means.

11. The solid state relay of claim 10 wherein said predetermined characteristic curve approximates that of a thermal breaker over said first current range.

12. A solid state relay for interrupting current flow in a power distribution circuit, comprising:
 (A) input circuit means for generating a peak line current signal representative of the peak instantaneous current in said power distribution circuit;
 (B) long time delay circuit means responsive to said peak line current signal for generating means responsive to said peak line current signal for generating a first trip signal whenever said peak instantaneous current said power distribution circuit rises above a selected pick-up value I1 for a time period which varies inversely with the magnitude of said peak instantaneous current, said long time delay circuit means comprising:
 (1) pulse generator means responsive to said peak line current signal for generating a pulse train having a frequency which varies as a direct function of the magnitude of said peak instantaneous current in said distribution circuit, the frequency of said pulse train being determined by a first predetermined time-current characteristic of said relay over a first current range extending between said selected pick-up current I1 and a higher current I2; each pulse of said pulse train having a predetermined height and width;
 (2) trip signal generating means responsive to said pulse train for generating said first trip signal when the magnitude of said peak instantaneous line current rises above said selected pick-up value I1 for a time period which varies as an inverse function of the magnitude of said peak instantaneous current and which is determined by said first predetermined time-current characteristic curve; said trip signal generating means comprising:
 (a) pick-up circuit means responsive to said peak line current signal for generating a disable signal whenever the magnitude of said peak instantaneous current is less than said selected pick-up value I1; and (b) counter circuit means for generating said first trip signal when said pulse generator circuit generates a predetermined number of pulses during a period of time when said pick-up circuit means does not generate said disable signal, said counter circuit means comprising an RC circuit including a capacitor which receives both said pulse train generated by said pulse generator means and said disable signal generated by said pick-up circuit means and further comprising a comparator for comparing the voltage across said capacitor to a preset value and for generating said first trip signal when said voltage across said capacitor reaches said preset value; said disable signal being a pulse train having a plurality which is opposite to the polarity of said pulse train generated by said pulse generator means.

13. A solid state relay for interrupting current flow in a power distribution circuit, comprising:
(A) input circuit means for generating a peak line current signal representative of the peak instantaneous current in said power distribution circuit;
(B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
  (1) pulse generator means comprising an operational amplifier having a feed back loop, said feed back loop including a multi-node RC element; said pulse generator means being responsive to said peak line current signal for generating a pulse train having a frequency which varies as a direct function of the magnitude of said peak instantaneous current in said distribution circuit, the frequency of said pulse train being determined by a first predetermined time-current characteristic curve which defines the desired operating characteristic of said relay over a first current range extending between said selected pick-up current I1 and a higher current I2, said first predetermined characteristic curve being determined by said multi-node RC element; each pulse of said pulse train having a predetermined height and width;
  (2) trip signal generating means responsive to said pulse train for generating said first trip signal when the magnitude of said peak instantaneous line current rises above said selected pick-up value I1 for said time period which varies as an inverse function of the magnitude of said peak instantaneous current; and
(C) circuit interrupter means for interrupting flow in said power distribution circuit responsive to the generation of said first trip signal by said long time delay circuit means.

14. The solid state relay of claim 13, wherein said trip generating means comprises:
(A) pick-up circuit means responsive to said peak line current signal for generating a disable signal whenever the magnitude of said peak instantaneous current is less than said selected pick-up value I1; and
(B) counter circuit means for generating said first trip signal when said pulse generator circuit generates a predetermined number of pulses during a period of time when said pick-up circuit means does not generate said disable signal.

15. The solid state relay of claim 13 or 14 wherein said predetermined characteristic curve approximates that of a thermal breaker over said first current range.

16. A solid state relay for interrupting current flow in a power distribution circuit, comprising:
(A) input circuit means for generating a peak line current signal representative of the peak instantaneous current in said power distribution circuit;
(B) long time delay circuit means responsive to said peak line current signal for generating a first trip signal whenever said peak instantaneous current in said power distribution circuit rises above a selected pick-up value I1 for a time period which varies inversely with the magnitude of said peak instantaneous current, said long time delay circuit means comprising:
  (1) pulse generator means responsive to said peak line current signal for generating a pulse train having a frequency which varies as a direct function of the magnitude of said peak instantaneous current in said distribution circuit, the frequency of said pulse train being determined by a first predetermined time-current characteristic curve which defines the desired operating characteristic of said relay over a first current range extending between said selected pick-up current I1 and a higher current I2; said pulse generator means comprising square wave generator means responsive to said peak line current signal for generating a square wave whose period varies inversely with the magnitude of said peak instantaneous current in said distribution circuit and which is determined by the transfer characteristic of said predetermined time-current characteristic curve, said pulse generator means generating a single output pulse of predetermined height and duration once during each period of said square wave responsive to a positive transition of said square wave;
  (2) trip signal generating means responsive to said pulse train for generating said first trip signal when the magnitude of said peak instantaneous line current rises above said selected pick-up value I1 for a time period which varies as an inverse function of the magnitude of said peak instantaneous current and which is determined by said first predetermined time-current characteristic curve; and
(C) circuit interrupter means for interrupting current flow in said power distribution circuit responsive to the generation of said first trip signal by said long time delay circuit means.

* * * * *